United States Patent [19]

Hogan et al.

[11] Patent Number: 4,741,710
[45] Date of Patent: May 3, 1988

[54] ELECTRICAL CONNECTOR HAVING A MONOLITHIC CAPACITOR

[75] Inventors: Edward P. Hogan, Sidney; Edward R. Gliha, Bainbridge; Ronald W. Morse, Sidney, all of N.Y.

[73] Assignee: Amphenol Corporation, Wallingford, Conn.

[21] Appl. No.: 926,938

[22] Filed: Nov. 3, 1986

[51] Int. Cl.$^4$ .............................. H01R 13/66
[52] U.S. Cl. ........................ 439/620; 333/185
[58] Field of Search ............... 333/181, 182, 183, 184, 333/185; 339/147 R, 147 P, 252 R; 439/620, 816, 608

[56] References Cited

U.S. PATENT DOCUMENTS

| | | | |
|---|---|---|---|
| 3,538,464 | 11/1970 | Walsh | 333/182 |
| 4,079,343 | 3/1978 | Nijman | 339/147 R |
| 4,083,022 | 4/1978 | Nijman | 339/147 R |
| 4,128,293 | 12/1978 | Paoli | 339/252 R |
| 4,191,445 | 3/1980 | Deal | 339/252 R |
| 4,275,945 | 1/1981 | Krantz et al. | 339/147 R |

Primary Examiner—Gil Weidenfeld
Assistant Examiner—Gary F. Paumen
Attorney, Agent, or Firm—Bacon & Thomas

[57] ABSTRACT

An electrical connector shell has a monolithic ceramic capacitor having active and ground electrodes for filtering contacts received in plated passages therethrough, and a grounding ring for grounding the contacts to the shell. A ceramic substrate is bonded to or extends integrally from a top face of the monolith, the substrate including a plated bore extending inwardly from its top surface, and a metal spring ring being disposed in the bore, each bore being axially aligned with one plated passage to complete an circuit path between the contact and the active electrodes and provided to eliminate stresses which could crack the fragile monolith. The grounding spring is characterized by a cylindrical metal annulus including angularly spaced foils at acute angles thereto, each foil being pivotably connected and completing a circuit path between the ground electrodes and the connector shell.

13 Claims, 2 Drawing Sheets

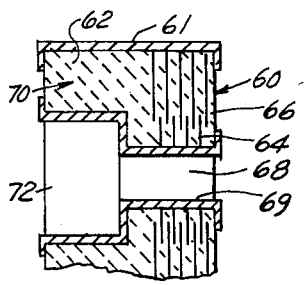
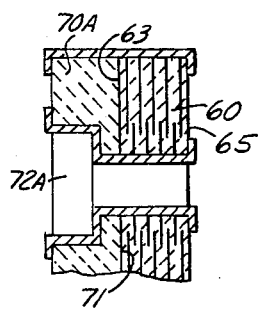
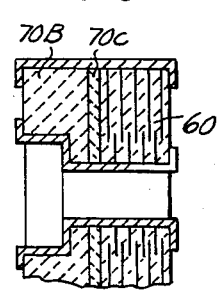
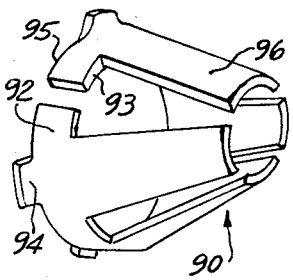
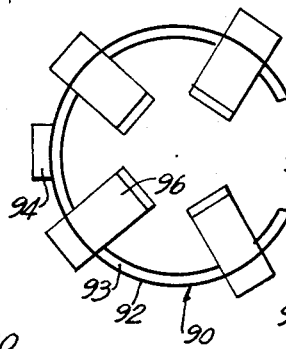
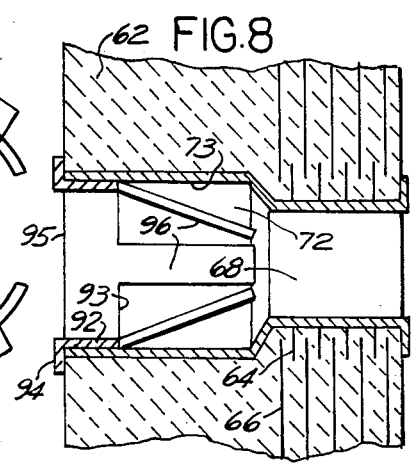
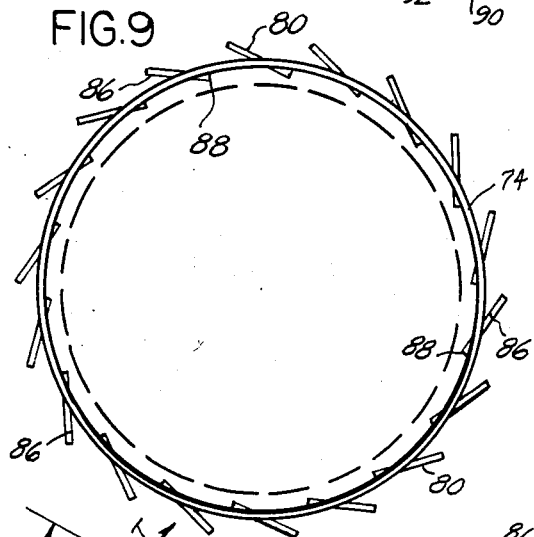
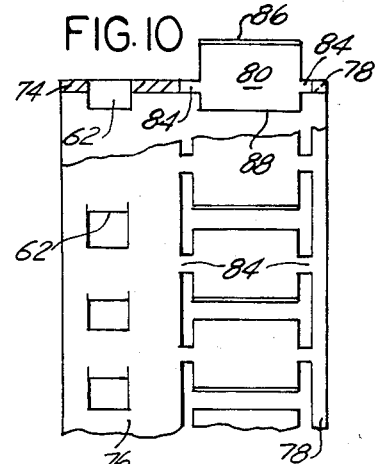
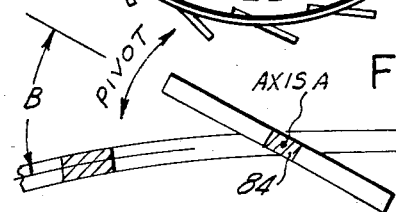
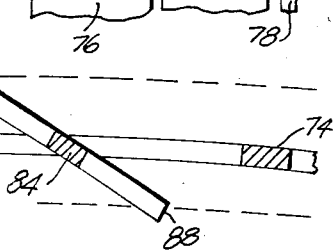

ELECTRICAL CONNECTOR HAVING A MONOLITHIC CAPACITOR

This invention relates to an electrical connector having a monolithic capacitor.

A monolithic capacitor comprises ceramic and metal sheets being stacked and fired whereby the ceramic will coalesce to form a sealed but fragile unitary structure, the metal sheets defining spaced ground and active (i.e., hot) electrodes, and the monolith having an array of conductive passages each connected to the active electrodes and sized to receive a contact. U.S. Pat. No. 3,538,464 "Multiple Pin Connector Having Ferrite Core Stacked Capacitor Filter" issued Nov. 3, 1970 to Walsh and shows a cylindrical C-section metal grounding spring encircling the periphery of and grippingly engaging the flat surfaces of two spaced monolithic capacitors and a pair of conductive rubber sleeves each compressing against a conductive pad on the flat surface of one respective monolith, the grounding spring completing an electrical path between the ground electrodes and the metal connector shell, and the compressed sleeve completing an electrical path between the active electrodes and its contact.

After firing the ceramic the monolith could be slightly warped (i.e., the center and the edges may not in the same plane) and the fired ceramic becomes fragile and is adversely affected by bending stresses. Because of this the monolith could crack either upon compressive engagement by the conductive rubber sleeve, or when the grounding spring is grippingly secured thereto, or when the contacts are inserted into their passages, or when the monolith is inserted into the shell,. Conductive rubber does not provide sufficient conductivity unless kept under compression and, when subject to time and temperature, will take a thermal set which will degrade electrical characteristics. A more reliable connection to the monolithic capacitor would be desirable.

Use of soldering and/or resilent springs is known to electrically and mechanically connect a contact to its plated passage and both aproaches can present special problems when applied to a ceramic monolith. Soldering could possibly damage the ceramic by thermal shock. Rework of a damaged monolithic capacitor is difficult, if not impossible, and thus increases scrap costs. Soldering requires costly fixtures and tooling, and requires solvent cleaning and drying after soldering thereby increasing the handling operations and the possibility of damage to the capacitor. A more desirable connection would not require costly equipment and/or increase manufacturing operations unless the user would be assured that the resulting product would be manufactured free from defects.

The monolith has little material to resist spring forces. Military specifications define the center to center spacing between contacts leaving little margin for design. However, to function as a capacitor the active and ground electrodes must have their respective areas overlapping and the active electrodes must communicate with the passage. To achieve contact densification and yet provide a adequate ceramic material to permit the electrodes to overlap each passage diameter is only slightly larger than the contact diameter. The insertion of a spring ring into each of a plurality of through passages could result in the spring rings combining to transmit a bending stress to the monolith which could be sufficient to crack the monolith. A desirable connection would not subject the capacitor to forces which could crack the monolith.

An electrical connector comprises a metal shell, a planar ceramic monolithic capacitor having an array of conductive passages passing therethrough and a conductive periphery therearound, the capacitor including spaced active and ground electrodes each being electrically connected, respectively, with the passage and the periphery, a plurality of contacts each passing through one respective passage, and connecting means for electrically connecting the ground electrodes to the shell and the active electrodes to the contacts. The connecting means comprises a conductive grounding spring encircling the monolith and completing an electrical and mechanical grounding connection between the inner wall of the shell and the outer periphery of the monolith.

The connecting means is characterized in that a ceramic substrate is an integral extension from the monolithic capacitor, the ceramic substrate including an array of plated bores each bore being axially aligned and electrically connected with one respective passage, and a conductive metal spring ring is received in each bore for completing an electrical circuit path between the active electrodes and its respective contact. The ceramic substrate is planar and each respective bore and passage defines a stepped passage, the bore extending inwardly from a top surface of the ceramic substrate and having a diameter greater than the diameter of its associated passage whereby to provide a countersunk recess sized to receive one conductive spring ring.

The conductive spring ring includes a radially contractible cylindrical band and a plurality of spring fingers, the band being adapted to radially expand against the plating in the bore to complete an electrical circuit path therewith and with the active electrodes, and each spring finger terminating in a free end which engages the contact.

Further, the ground spring is characterized by a sheet of metal being stamped and formed into a cylinder and provided with angularly spaced flat rectangular foils and two spaced parallel strips, each foil having a tab at each opposite end for connecting to one respective strip, the foils being angularly separated and pivotably connected to the strips by the tabs, and each foil being disposed in a plane at an acute angle relative to a plane tangent to the cylinder and passing through the pivot axis. The foils complete an electrical path between the inner wall of the shell and the outer periphery of the monolith.

The ceramic substrate could be integrally formed with the monolith when the monolith is formed thus providing a rigid ceramic base. The ceramic substrate could be of a high strength dielectric ceramic and separately provided and the monolith laminated thereto.

The ceramic substrate extension advantageously makes possible the provision of a countersunk bore having an increased diameter thereby reducing the complexity and cost of electrically connecting the active electrodes to each contact. The ceramic substrate spaces the active electrodes from the countersunk bore receiving the spring ring thereby protecting the active electrodes protects them from damage should the monolith be chipped. The ceramic substrate increases the rigidity of the planar capacitor when laminated thereto and will not degrade under time and temperature. Increasing the monolith rigidity increases the liklihood that the monolith will not crack either when provided with the encircling ground spring and spring rings or when inserted into the connector shell.

A more complete understanding of this invention may be obtained from the detailed description that follows taken in combination with the following drawings:

FIGS. 3-5 show detail of a monolithic capacitor with a ceramic substrate.

FIG. 6-7 show a conductive spring ring.

FIG. 8 is a section view of the spring ring mounted in the ceramic substrate of the monolithic capacitor shown in FIG. 3.

FIG. 9 is a plan view of a grounding spring.

FIG. 10 is an enlarged view in partial section of the grounding spring shown in FIG. 9.

FIG. 11 is an enlarged view of a portion of the grounding spring shown in FIG. 9.

Figure 1:
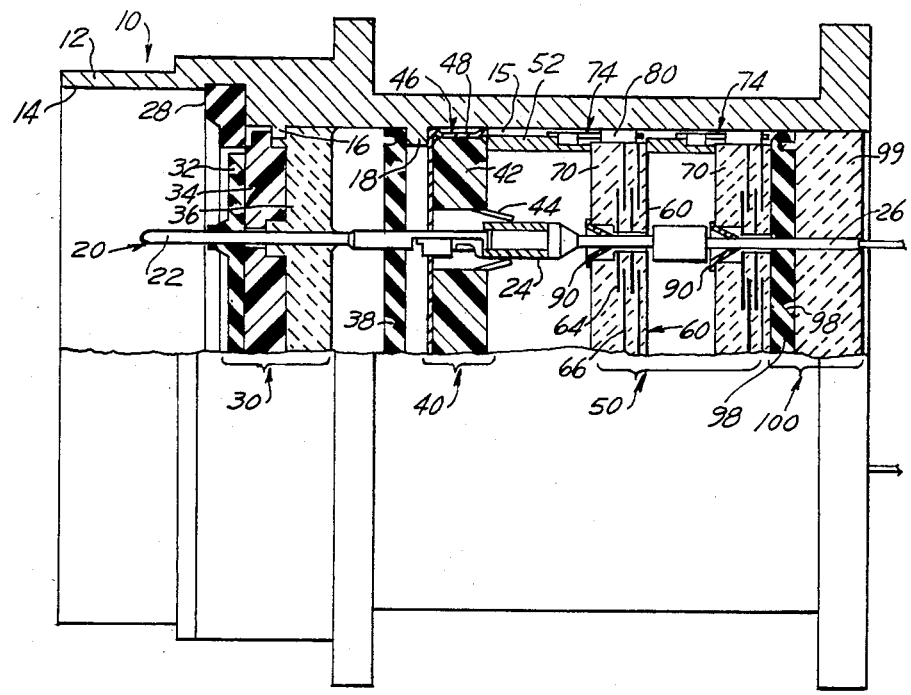
FIG. 1 is a partially sectioned side view of an electrical connector having planar monolithic capacitors.

Referring now to the drawings, FIG. 1 shows a partially sectioned side view of an electrical connector 10 including a cylindrical metal shell 12, an insert assembly 30 in the forward portion of the shell, a grounding assembly 40 in the medial portion of the shell, a monolithic capacitor assembly 50 and a retention assembly 100 in the rearward portion of the shell, and a contact 20 extending through the assemblies. Extending radially inward from the inner wall 14 of the shell is a forward shoulder 16 and a rearward shoulder 18. The contact 20 has a forward end portion 22 extending forwardly of the insert assembly for mating, a medial portion 24 disposed in the grounding assembly for completing an electrical path to the shell, and a rearward end portion 26 extending rearwardly of the capacitor assembly for further termination.

The insert assembly 30 includes an external interfacial seal 32, an internal dielectrical insert 34, an internal body of epoxy 36, and an internal seal 38. Each such member is generally planar, cylindrical and has a passage therethrough for receiving the forward end portion of the contact. A peripheral gasket 28 seals around the shell inner wall adjacent to the insert assembly.

The grounding assembly 40 includes a cylindrical metallized plastic wafer 42 seated in a cylindrical cup-shaped metal grounding sleeve 46 each having a respective passage therethrough for receiving the medial portion of the contact. The wafer arranges resilient fingers 44 angularly around its passage to describe a cone, each finger extending therefrom to its respective free end which will engage the contact. The wafer surface is conductively plated (including the fingers and its passage) to complete an electrical path between the contact and the grounding sleeve 46. The grounding sleeve 46 is shaped like a bottle-cap with the outer circumference slitted whereby to define resilient angularly spaced spring fingers 48 the inner surfaces thereof engaging the outer circumference of the wafer and the outer surfaces thereof engaging the inner wall of the shell to thereby complete an electrical circuit path therebetween.

The retention assembly 100 comprises a seal 98 and a body of epoxy 99 for sealing the capacitor assembly and the contact into the shell.

Figure 2:
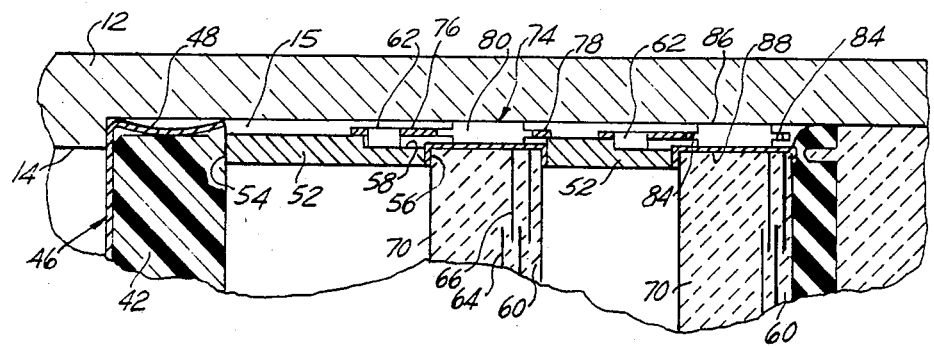
FIG. 2 is an enlarged view of a portion of the electrical connector shown in FIG. 1.

In accordance with this invention, the monolithic capacitor assembly 50 includes a pair of cylindrical metal spacers 52 and a pair of cylindrical monolithic capacitors 60, each capacitor being generally planar and having a conductively plated passage 68 (as shown in FIG. 3) extending between its top and bottom surfaces for receiving the contact 20. As shown in FIG. 2, each spacer has axial faces 54, 56 and a groove 58 in its outer circumference, the spacer being provided to space the capacitors from one another.

Each capacitor 60 is generally cylindrical and has a plated circumference, planar top and bottom surfaces, and conductively plated passages 68 (only one shown) extending between the surfaces, the capacitor being formed into a monolith as a result of a ceramic material 62 being coalesced about a plurality of spaced parallel active electrodes 64 and ground electrodes 66 (i.e., metal sheets). The active electrodes terminate to the passage plating and the ground electrodes terminate to the circumference plating.

As shown in FIG. 3, in particular, a ceramic substrate 70 extends from the top surface of each capacitor. This ceramic substrate includes a conductively plated bore 72 extending therethrough, the bore being axially aligned with an associated passage 68 and having a cylindrical cross-section defined by a diameter that is greater than the dimension defining the passage cross-section whereby to define a stepped passageway. The plating 69 in the bore forms a continuation of the passage plating and thus is electrically connected thereto.

Further, as shown in FIG. 2 a conductive grounding spring 74 is disposed in an annulus 15 formed between the inner wall of the shell and the the outer circumference of the capacitors, the grounding spring being axially spaced from the grounding sleeve 46 and adapted to engage both the inner wall of the shell and the outer periphery of an associated capacitor.

A cylindrical, longitudinally slit, radially expansible/contractible, frusto-conical, conductive spring ring 90 is configured to fit within the bore, the spring ring being adapted to complete an electrical circuit path between the contact and the active electrodes as a result of expanding engagement against the plated wall of the bore.

FIG. 2 is an enlarged view of a portion of the electrical connector shown in FIG. 1 showing detail of the grounding assembly 40, the engagement of the grounding spring 74 and the grounding sleeve 46 with the inner wall 14 of the shell, the capacitor assembly 50 and the cylindrical metal spacers 52, one spacer for spacing the wafer 42 from the forwardmost capacitor 60 and the other spacer for spacing the capacitors from one another. Each spacer includes a groove 58 on its outer periphery.

With reference to FIGS. 9, 10 and 11, the grounding spring 74 comprises a metal sheet being stamped and formed into a cylinder which is diametered to be interposed in the annulus 15 between the capacitor assembly and the inner wall of the shell. The grounding spring includes a pair of annular strips 76, 78 and plurality of rectangular shaped foils 80 each pivotably connected to the strips, each foil having an outer longitudinal edge 86 adapted to contact the shell, an inner longitudinal edge 88 adapted to contact the monolith, and opposite webs or end portions 84 each connected to one respective strip. The foils are uniformly spaced angularly around the cylinder form with each respective rectangular foil being twisted about its end portions relative to the plane of the spring such that each foil is at an acute angle to a tangent plane to the spring and passing through the end portions. The protuberance 62 extends radially inward from the strip 76, the protuberance being adapted to seat in the groove 58 in the spacer 52 to position the grounding spring 74 and to enhance the electrical ground path to the shell.

FIGS. 3–5 show arrangements including monolithic capacitor members. FIGS. 3 and 4 show a ceramic substrate being integrally formed with the capacitor and FIG. 5 shows a ceramic substrate being separately provided.

In FIG. 4 a ceramic substrate 70 comprises the same ceramic 62 as the capacitor 60, a suitable ceramic being barium titanate, a material having a high dielectric constant. This ceramic substrate is layered to extend upwardly from the top surface of the capacitor and fired simultaneously therewith, the top surface not being shown since it is in the interior of the monolith. The stepped passageway (including the bore 72 in the ceramic substrate 70 and the passage 68 in the capacitor 60) and the outer periphery 61 of the monolith formed are conductively plated, plating 69 covering the walls of the stepped passageway. Further, conductive plating is provided on the top face of the ceramic substrate adjacent to the bore where it extends into the ceramic substrate, and to the bottom surface of the capacitor and to the top face of the ceramic substrate adjacent to the circumference each forming continuations of the plating therearound.

In FIG. 4 a ceramic substrate 70A is integrally formed with the barium titanate capacitor, the substrate having planar top and bottom surfaces and consisting of a high strength ceramic such as alumina, and the alumina being layered to extend from the top surface 63 of the capacitor and fired thereto. The countersunk bore 72A is axially aligned with the passage 68 and stepped to include a first and a second portion each of a different cross-section, the first portion terminating on the top face and being adapted to receive the spring ring 90 and the second portion forming a continuation of the passage. The plating would be as described for FIG. 3.

FIG. 5 shows a ceramic substrate 70B being separately provided and bonded at 70C to the top surface 63 of the monolithic capacitor, the ceramic substrate having a stepped bore as described in FIG. 4 being axially aligned with the capacitor passage. The plating would be as described for FIG. 3. The materials would be as described for FIGS. 3 and 4.

FIGS. 6 and 7 show the conductive spring ring 90 including a longitudinally slit, radially contractible, cylindrical band 92 having forward and rearward edges 93, 95, a plurality of spring fingers 96 extending forwardly and radially inward from the forward edge to describe with their free ends a cone for engaging the contact, and a tab 94 extending radially outward from the rearward edge for engaging the plated area around the bore when the spring ring is inserted therein.

FIG. 8 is a section view of the spring ring 90 mounted in the monolithic capacitor of FIG. 3. The cylindrical band 92 has expanded radially outward so that the band engages the plating 73 on the bore 72, the tabs 94 seat on the ceramic substrate and against the plating thereon encircling the entry into the bore, and the spring fingers 96 have their free ends disposed adjacent to the monolithic capacitor 60.

FIGS. 9–11 show the grounding spring 74. FIG. 9 is an end view of the grounding spring, the spring comprising strips being formed into a cylindrical annulus with the foils 80 disposed at an acute angle to a tangent drawn the the annulus at the point of connection thereto.

FIG. 10 is an enlarged view in partial section of the grounding spring 74 shown in FIG. 9. One of the annular strips 76 includes the inward radial protuberances 62 each adapted to engage the metallic spacer and one set of webs 84 which interconnect to the respective set of foils. The other annular strip 78 is connected to the other set of webs 84 which interconnect to the respective set of foils.

FIG. 11 is an enlarged view showing part of the grounding sleeve shown in FIG. 9. Each respective foil 80 pivots about an axis "A" extending through its end portion connections (i.e., webs 84) to the spaced annular strips, such axis being parallel to the connector and grounding spring axes, and each foil being in a plane disposed at an acute angle "B" to another plane tangent to the pivot axis. Each respective foil acute angle is greater than 60° and preferably at an angle between 60° and 90°.

To make the grounding spring, a flat sheet of metal is stamped to form a pair of longitudinal strips having a plurality of foils 80, each foil having opposite end portions and extending between the strips 76, 78, and a web 84 extending from each strip and connecting to the end portion of a foil. The foils are twisted about their web connections so that each foil is at an acute angle to the sheet. The sheet is then cut laterally to form a finite longitudinal sheet portion having end faces. The sheet portion is then rolled into a cylinder wherein the end faces adjoin, the strips defining the circumference of a cylinder having a diameter sized to fit the annulus. One of the strips is deformed so that a plurality of angularly spaced protuberances 62 extend radially inward when the sheet portion is rolled, the protuberances being angularly spaced and functioning to position and engage one of the spacers.

Having described the invention what is claimed is:

1. An electrical connector comprising a metal shell, a planar monolithic ceramic capacitor having top and bottom surfaces and including a plurality of active and ground electrodes coalesced in its ceramic, a conductively plated passage passing between the surfaces, a contact retained within the passage, and connecting means for electrically connecting the ground electrodes to the shell and the active electrodes to the contact, the connecting means including a conductive grounding spring encircling the capacitor and completing an electrical and mechanical connection between the shell and the ground electrodes and further characterized by a ceramic substrate extending from the top surface of the capacitor and having a conductively plated bore extending therethrough, said bore being axially aligned with and electrically connected to the passage, and a conductive spring ring mounted substantially entirely within the bore for completing an electrical circuit path between the active electrodes and the contact.

2. The electrical connector as recited in claim 1 wherein said bore has a cross-sectional diameter greater than the diameter of said passage.

3. The electrical connector as recited in claim 2 wherein said bore is stepped and includes a first and a second portion, the first portion being defined by said cross-section, and the second portion forming a continuation of the passage, and said spring ring is substantially disposed within said first portion.

4. The electrical connector as recited in claim 1 wherein said ceramic substrate is integrally formed with said capacitor and formed of the same ceramic as the capacitor.

5. The electrical connector as recited in claim 2 wherein said ceramic substrate is separately provided and has planar top and bottom faces, the bottom face being bonded to the top surface of said capacitor, the bore is axially aligned with said passage and extends from said top face into the ceramic substrate, and said spring ring terminates adjacent to said bottom face.

6. The electrical connector as recited in claim 1 wherein the conductive grounding spring comprises a pair of cylindrical metal strips and a plurality of angularly spaced foils, each respective foil extending between and being pivotally connected to one respective strip, the foils independently resiliently contacting the inner wall of the shell and the outer periphery of the capacitor.

7. The electrical connector as recited in claim 6 wherein each said foil has a web extending from opposite end portions thereof with each web connecting to only one respective strip, an imaginary line passing through the webs of each respective foil defining an axis about which the foil pivots, each pivot axis being generally parallel with the primary connector axis and the locus of pivot axes describing an imaginary cylindrical annulus about the capacitor.

8. The electrical connector as recited in claim 6 wherein each said foil is at an acute angle to a tangent plane to the grounding spring at the pivot axis.

9. The electrical connector as recited in claim 6 wherein each said foil is rectangularly shaped and has a pair of longitudinal edges and a pair of lateral edges each having a web extending therefrom, each web being connected to one respective strip, and one and the other longitudinal edge, respectively, contacting the shell and the capacitor.

10. The electrical connector as recited in claim 8 wherein each respective foil is in a plane disposed at an angle greater than 60° relative to the plane tangent to the grounding spring.

11. The electrical connector as recited in claim 8 wherein each respective foil is in a plane disposed at an angle between 60° and 90° relative to the plane tangent to the grounding sleeve.

12. The electrical connector as recited in claim 1 including a plurality of respective plated passages, plated bores, spring rings and contacts.

13. The electrical connector as recited in claim 1 further comprising a pair of monolithic capacitors each having a ceramic substrate extending from its top surface, conductive plating being selectively applied to the top and bottom surfaces of the capacitors and forming, respectively, first and second conductive extensions of the periphery and bore plating, spacer means for spacing the capacitors and making electrical contact with the first conductive extension from each capacitor, means extending from said spring ring for positioning the the spring ring about its bore and making electrical contact with said second conductive extension, and means connecting said groove and said grounding spring for positioning the grounding spring relative to the capacitors.

* * * * *